(12) United States Patent
Lee et al.

(10) Patent No.: US 8,682,242 B2
(45) Date of Patent: Mar. 25, 2014

(54) SYSTEM, APPARATUS, AND METHOD FOR COMMUNICATING WAKE-UP SIGNAL, AND WIRELESS TERMINAL

(75) Inventors: Seung Sik Lee, Daejeon (KR); Mi Kyung Oh, Gyeongsangbuk-do (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 167 days.

(21) Appl. No.: 13/314,453

(22) Filed: Dec. 8, 2011

(65) Prior Publication Data
US 2012/0163422 A1 Jun. 28, 2012

(30) Foreign Application Priority Data
Dec. 23, 2010 (KR) .................. 10-2010-0133693

(51) Int. Cl.
*H04B 1/16* (2006.01)
*H04B 7/14* (2006.01)

(52) U.S. Cl.
USPC .......................................... 455/7; 455/343.3

(58) Field of Classification Search
USPC ................ 455/7, 13.4, 91, 334, 343.1, 343.2, 455/343.3
See application file for complete search history.

(56) References Cited

U.S. PATENT DOCUMENTS

| 7,102,505 B2* | 9/2006 | Kates ............................ 340/521 |
| 7,893,827 B2* | 2/2011 | Kates ......................... 340/539.1 |
| 8,204,540 B2* | 6/2012 | Hohl .......................... 455/556.1 |
| 8,351,848 B2* | 1/2013 | Mohanty et al. ............. 455/11.1 |
| 2008/0031174 A1* | 2/2008 | Saifullah et al. .............. 370/311 |
| 2010/0150042 A1* | 6/2010 | Oh et al. ....................... 370/311 |

FOREIGN PATENT DOCUMENTS

| KR | 1020090095174 A | 9/2009 |
| KR | 1020100068790 A | 6/2010 |

* cited by examiner

*Primary Examiner* — Blane J Jackson
(74) *Attorney, Agent, or Firm* — Ladas & Parry LLP (57) ABSTRACT

A wake-up signal communication system including a wake-up center, a wake-up signal repeating apparatus, and a wireless terminal is provided. The wake-up center transmits the first wake-up signal. The wake-up signal repeating apparatus generates the second wake-up signal with the first wake-up signal and the code of the wireless terminal, and transmits the second wake-up signal. The wireless terminal determines a wake-up based on the second wake-up signal.

13 Claims, 12 Drawing Sheets

SYSTEM, APPARATUS, AND METHOD FOR COMMUNICATING WAKE-UP SIGNAL, AND WIRELESS TERMINAL

CROSS-REFERENCE TO RELATED APPLICATION

This application claims priority to and the benefit of Korean Patent Application No. 10-2010-0133693 filed in the Korean Intellectual Property Office on Dec. 23, 2010, the entire contents of which are incorporated herein by reference.

BACKGROUND OF THE INVENTION (a) Field of the Invention

The present invention relates to a system, an apparatus, and a method for communicating a wake-up signal and a wireless terminal.

Particularly, the present invention relates to a communication apparatus for generating, transmitting, and receiving a wake-up signal.

(b) Description of the Related Art

Generally, in a wireless network, reducing power consumption has become a significant issue, and various techniques related to a wake-up signal have been proposed in order to design a wireless terminal with low power consumption. According to the techniques related to a wake-up signal that have been proposed, basically, a transmitter transmits a wake-up signal to a plurality of receivers. Specifically, when the transmitter transmits the wake-up signal in a wireless network, the plurality of receivers analyze a received signal and provide power to a system in a main path if the received signal is determined to be the wake-up signal.

However, this causes a communication distance between the transmitter and the receiver to be limited by the use of power. As a result, the communication distance is substantially limited to a radius of several meters.

Accordingly, a wake-up system that may reduce power consumption of more wireless terminals in a broader range is needed.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention has been made in an effort to provide a system, an apparatus, and a method for communicating a wake-up signal having advantages of increasing a communication distance for the wake-up signal so that a plurality of receivers located within a wider range can receive the wake-up signal with low power consumption.

An exemplary embodiment of the present invention provides an apparatus for communicating a wake-up signal. The apparatus includes: a detector for rectifying a first wake-up signal and generating a rectified signal; a code generator for outputting a code signal that corresponds to a code of a wireless terminal; and a comparator for generating a second wake-up signal to be transmitted to the wireless terminal that is to be woken up by using the rectified signal and the code signal.

Here, the rectified signal may be input to a non-inverting terminal of the comparator and the code signal may be input to an inverting terminal of the comparator.

In addition, the code signal may have a low level of a bit "1" and may have a high level of a bit "0".

A value of the high level may be higher than a maximum value of the rectified signal.

The apparatus may further include a first antenna for receiving the first wake-up signal from a wake-up center, and a band pass filter for filtering the first wake-up signal and generating a filtered signal. In this case, the detector may rectify the filtered signal.

The apparatus may further include a first variable amplifier for performing variable amplification on the filtered signal and generating an amplified signal, wherein the detector rectifies the amplified signal.

In addition, the apparatus may further include a second variable amplifier for performing variable amplification on the second wake-up signal and transmitting the amplified second wake-up signal through a second antenna.

Another exemplary embodiment of the present invention provides a method for communicating a wake-up signal. The method includes rectifying a first wake-up signal and generating a rectified signal, generating a code signal that corresponds to a code of a terminal to be woken up, and generating a second wake-up signal to be transmitted to the terminal by using the rectified signal and the code signal.

The rectifying of the first wake-up signal may include receiving the first wake-up signal from a wake-up center.

The rectifying of the first wake-up signal further may include: performing band pass filtering on the first wake-up signal and generating a filtered signal; performing variable amplification on the filtered signal and generating an amplified signal; and rectifying the amplified signal and generating the rectified signal.

In addition, the generating of a second wake-up signal may include performing variable amplification on the second wake-up signal.

The generating of a second wake-up signal may include comparing the rectified signal and the code signal to generate the second wake-up signal.

Here, the code signal may have a low level of a bit "1" and have a high level of a bit "0", and a value of the high level may be higher than a maximum value of the rectified signal.

Yet another exemplary embodiment of the present invention provides a system for communicating a wake-up signal. The system includes: a wake-up center for transmitting a first wake-up signal; a wake-up repeating apparatus for generating a second wake-up signal using the first wake-up signal and transmitting the second wake-up signal; and a wireless terminal for determining a wake-up based on the second wake-up signal.

The wake-up signal repeating apparatus may generate the second wake-up signal by using a code of the wireless terminal.

The wake-up signal repeating apparatus may rectify the first wake-up signal to generate a rectified signal and compare the rectified signal with a code signal corresponding to the code to generate the second wake-up signal.

Yet another embodiment of the present invention provides a wireless terminal. The wireless terminal includes: an antenna for receiving a wake-up signal; a detector for rectifying the wake-up signal and generating a rectified signal; a comparator for comparing the rectified signal and a reference voltage and generating a comparison signal; and a wake-up determining unit for determining a wake-up by comparing the comparison signal and a code of the terminal.

DETAILED DESCRIPTION OF THE EMBODIMENTS

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

Through the specification, in addition, unless explicitly described to the contrary, the word "comprise" and variations such as "comprises" or "comprising" will be understood to imply the inclusion of stated elements but not the exclusion of any other elements.

In this specification, a wireless terminal may refer to a terminal, a mobile station (MS), a mobile terminal (MT), a subscriber station (SS), a portable subscriber station (PSS), user equipment (UE), or an access terminal (AT). The wireless terminal may include all or part of the functions of the terminal, the mobile station, the mobile terminal, the subscriber station, the portable subscriber station, and the user equipment.

A wake-up signal communication system and a communication apparatus according to an exemplary embodiment of the present invention will be described with reference to the drawings.

Figure 1:
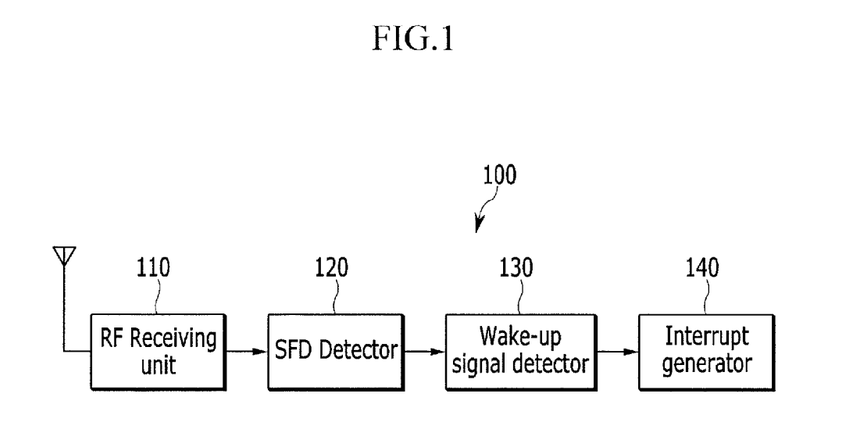
FIG. 1 shows a block diagram of an apparatus for receiving a wake-up signal according to an exemplary embodiment of the present invention.

FIG. 1 shows a block diagram of an apparatus for receiving a wake-up signal according to an exemplary embodiment of the present invention.

As shown in FIG. 1, an apparatus 100 for receiving a wake-up signal according to an exemplary embodiment of the present invention includes a radio frequency (RF) receiving unit 110, a start-of-frame delimiter (SFD) receiving unit 120, a wake-up signal detector 130, and an interrupt generator 140.

The RF receiving unit 110 monitors a channel during a search time that is shorter than a search period that is repeated according to a predetermined period to receive an RF signal.

The SFD receiving unit 120 detects a start-of-frame delimiter (SFD) from the RF signal provided from the RF receiving unit 110.

Meanwhile, the RF receiving unit 110 continues to receive an RF signal and the wake-up signal detector 130 detects a wake-up signal from the received RF signal when the SFD receiving unit 120 detects the SFD.

When the wake-up signal detector 130 detects the wake-up signal, the interrupt generator 140 generates an interrupt so that power is supplied to a system in the main path.

By the above, it is possible to reduce power consumption used in receiving a wake-up signal, but the RF receiving unit 110 and the SFD detector 120 are required to receive a relatively large signal. That is, power consumption increases in order to increase the amplitude of the received signal, and an available distance between a transmitter and a receiver is sharply reduced in order to reduce power consumption.

Next, a wake-up signal communication system, a communication apparatus, and a communication method to further reduce power consumption and further increase a communication distance will be described with reference to FIGS. 2 to 12.

Figure 2:
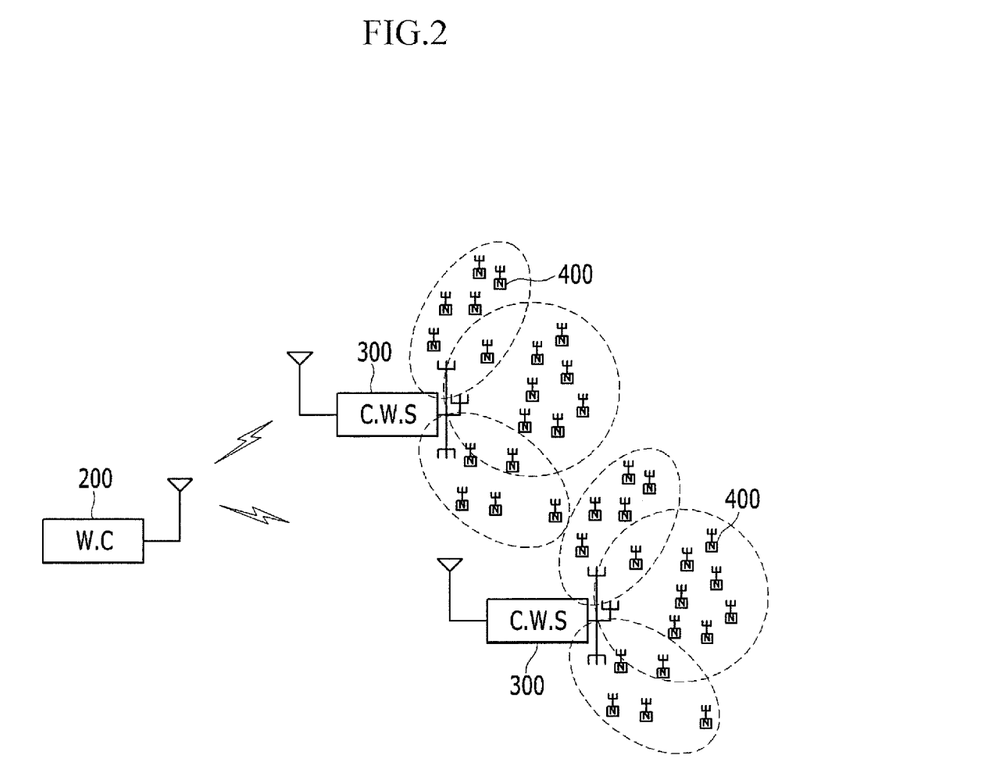
FIG. 2 shows a wake-up signal communication system according to an exemplary embodiment of the present invention.

FIG. 2 shows a wake-up signal communication system according to an exemplary embodiment of the present invention.

As shown in FIG. 2, the wake-up signal communication system according to an exemplary embodiment of the present invention includes at least one wake-up center (W.C) 200, a plurality of central wake-up systems (C.W.S) 300, and a plurality of wireless terminals 400.

The wake-up center 200 generates the first wake-up signal for the wake-up of the plurality of wireless terminals 400 and transmits the first wake-up signal to the central wake-up system 300.

Each central wake-up system 300 corrects and amplifies the wake-up signal received from the wake-up center 200 to generate the second wake-up signal, and transmits the second wake-up signal to a plurality of wireless terminals 400 that are positioned within its service coverage area.

Figure 3:
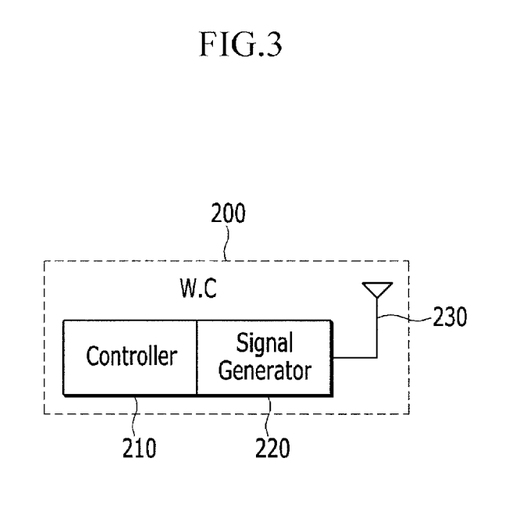
FIG. 3 shows a block diagram of a wake-up center according to an exemplary embodiment of the present invention.

FIG. 3 shows a block diagram of a wake-up center according to an exemplary embodiment of the present invention.

As shown in FIG. 3, the wake-up center 200 includes a controller 210, a signal generator 220, and an antenna 230.

The controller 210 controls generation of the first wake-up signal. The signal generator 220 generates the first wake-up signal according to the control of the controller 210, and transmits the first wake-up signal through the antenna 230.

Figure 4:
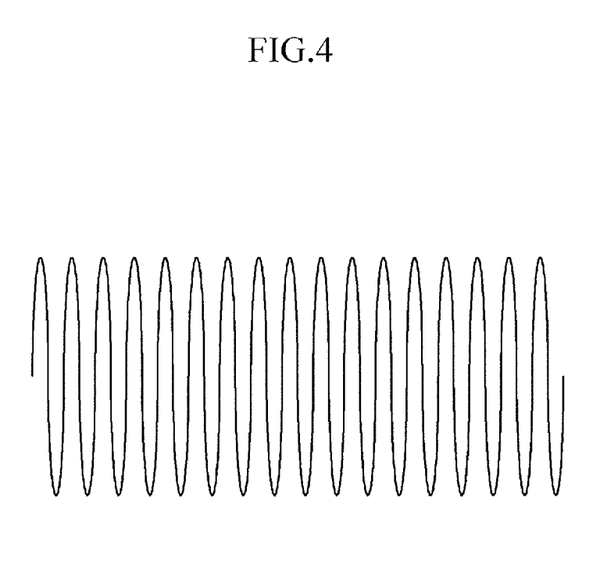
FIG. 4 shows a waveform diagram of a first wake-up signal according to an exemplary embodiment of the present invention.

FIG. 4 shows a waveform diagram of the first wake-up signal according to an exemplary embodiment of the present invention.

The wake-up center 200 may transmit the first wake-up signal having a waveform shown in FIG. 4 through the antenna 230.

Figure 5:
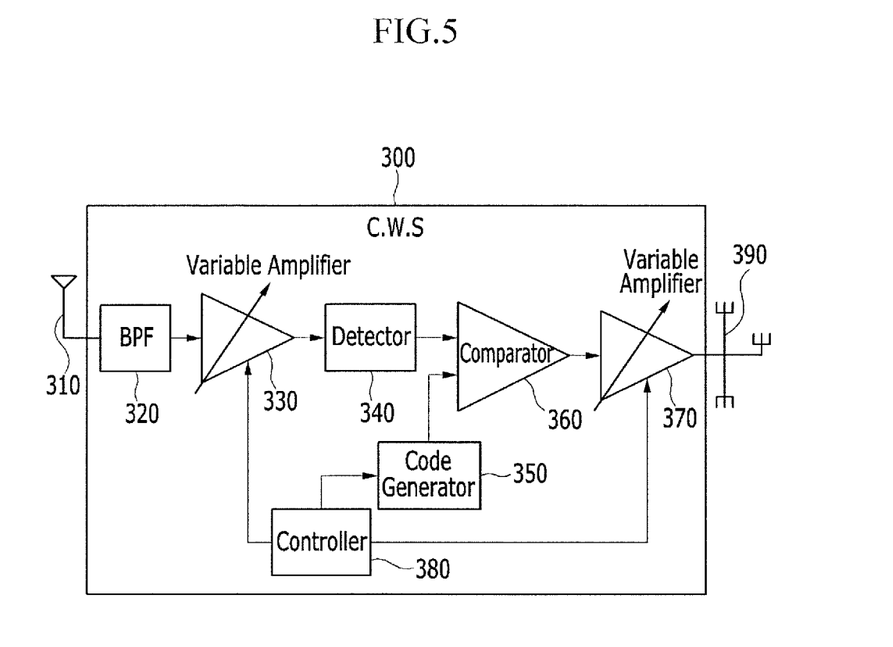
FIG. 5 shows a central wake-up system according to an exemplary embodiment of the present invention.

FIG. 5 shows a block diagram of a central wake-up system according to an exemplary embodiment of the present invention.

As shown in FIG. 5, the central wake-up system 300 according to an exemplary embodiment of the present invention includes a first antenna 310, a band pass filter (BPF) 320, a first variable amplifier 330, a detector 340, a code generator 350, a comparator 360, a second variable amplifier 370, a controller 380, and a second antenna 390. The central wake-up system 300 functions as a repeater for repeating a wake-up signal between the wake-up center 200 and the wireless terminal 400. The central wake-up system 300 will be described with reference to FIG. 6 to FIG. 9.

Figure 6:
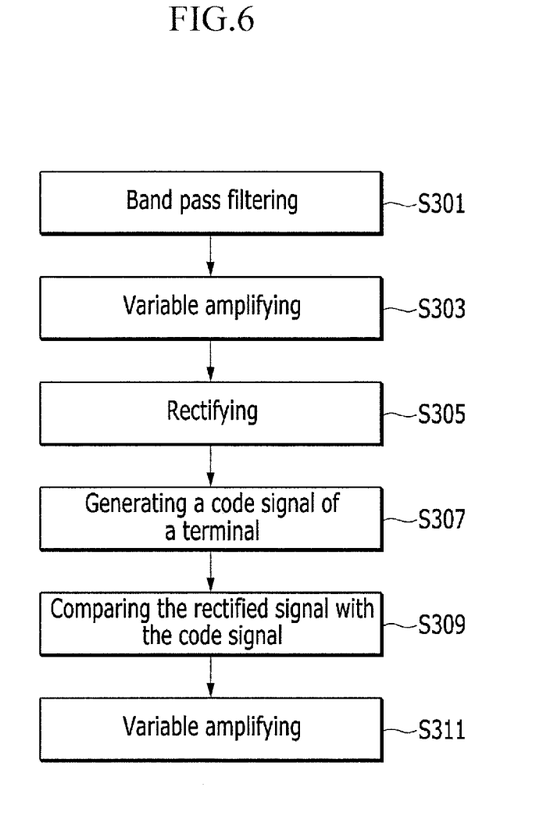
FIG. 6 shows a flowchart representing an operation of a central wake-up system according to an exemplary embodiment of the present invention.

FIG. 6 shows a flowchart for representing the operation of the central wake-up system according to an exemplary embodiment of the present invention.

First, the band pass filter 310 performs band pass filtering on the first wake-up signal received through the first antenna 310 and generates a filtered signal (S301).

The first variable amplifier 330 performs variable amplification on the filtered signal according to the control of the controller 380 to regulate the amplitude of the filtered signal to be constant, and generates an amplified signal (S303).

Figure 7:
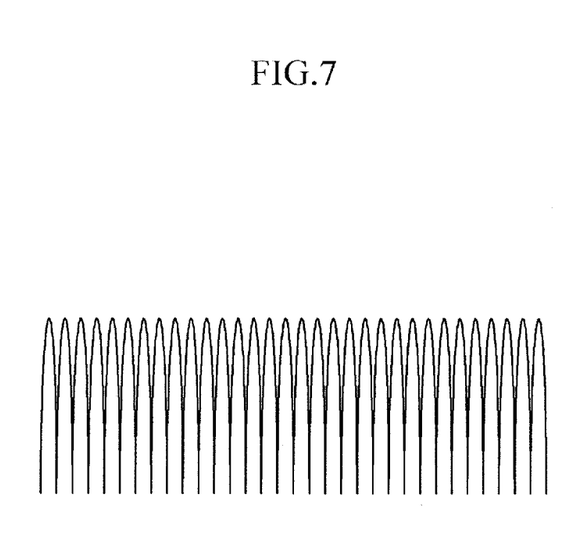
FIG. 7 shows a waveform diagram of an output signal of a detector in a central wake-up system according to an exemplary embodiment of the present invention.

The detector 340 rectifies the amplified signal and generates the rectified signal (S305). FIG. 7 shows a waveform of an output signal of the detector in the central wake-up system according to an exemplary embodiment of the present invention. The detector 340 according to an exemplary embodiment of the present invention may generate the rectified signal having a waveform shown in FIG. 7.

Figure 8:
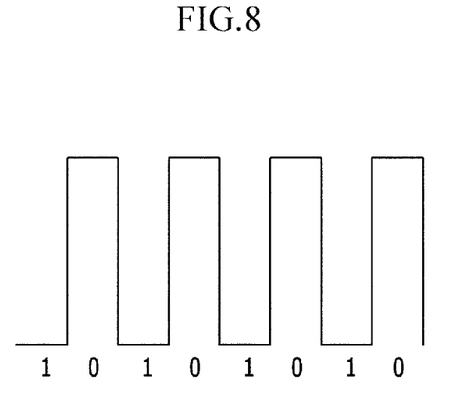
FIG. 8 shows a waveform diagram of an output signal of a code generator in a central wake-up system according to an exemplary embodiment of the present invention.

The code generator 350 outputs, according to the control of the controller 380, a code signal for a wireless terminal that is to be woken up (S307). FIG. 8 shows a waveform of an output signal of the code generator in the central wake-up system according to an exemplary embodiment of the present invention. As shown in FIG. 8, when a code of a wireless terminal to be woken up corresponds to "101010", the code generator 350 may output a low level signal to a bit "1" and output a high level signal to a bit "0". When the output signal of the detector 340 corresponds to the signal shown in FIG. 7, the value, that is, the amplitude of the high level signal is higher than the maximum value of the signal shown in FIG. 7.

Figure 9:
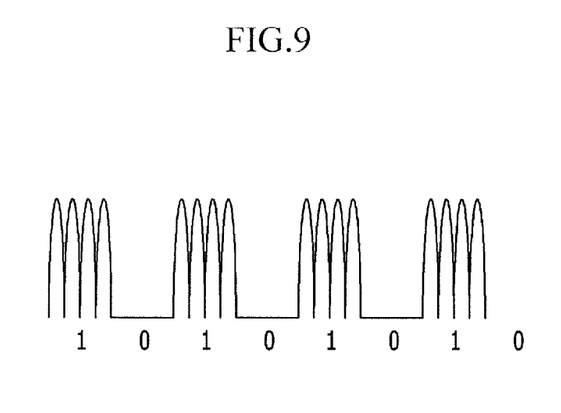
FIG. 9 shows a waveform diagram of an output signal of a comparator in a central wake-up system according to an exemplary embodiment of the present invention.

The comparator 360 compares the rectified signal output from the detector 340 with the code signal output from the code generator 350 to generate a comparison signal (S309). FIG. 9 shows a waveform of an output signal of the comparator in the central wake-up system according to an exemplary embodiment of the present invention. When the output signal of the detector 340 as shown in FIG. 7 is input to the non-inverting terminal of the comparator 360 and the output signal of the code generator 350 as shown in FIG. 8 is input to the inverting terminal of the comparator 360, the comparator 360 outputs the comparison signal shown in FIG. 9.

The second variable amplifier 370 performs variable amplification on the signal output from the comparator 360 according to the control of the controller 380, and generates and transmits the second wake-up signal through the second antenna 390 (S311).

Figure 10:
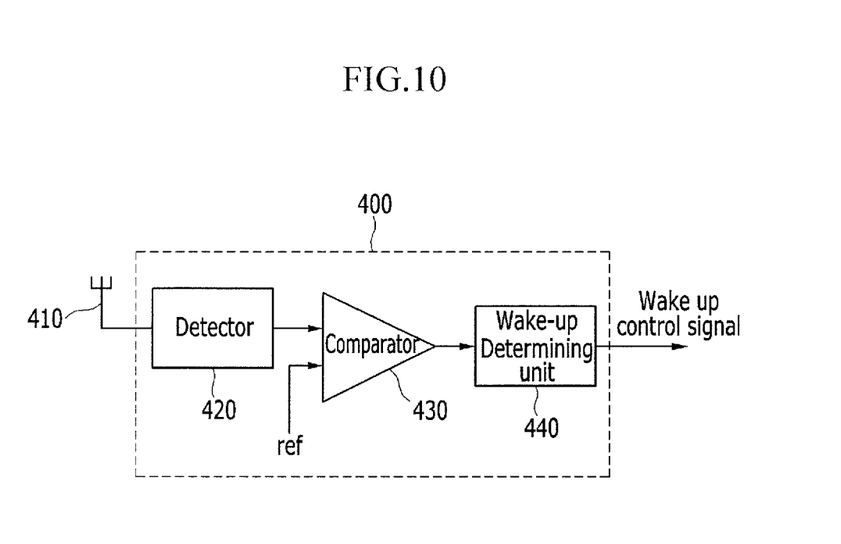
FIG. 10 shows a block diagram of a wireless terminal according to an exemplary embodiment of the present invention.

FIG. 10 shows a block diagram of a wireless terminal according to an exemplary embodiment of the present invention.

As shown in FIG. 10, the wireless terminal 400 according to an exemplary embodiment of the present invention includes an antenna 410, a detector 420, a comparator 430, and a wake-up determining unit 440. The constituent elements of the wireless terminal according to an exemplary embodiment of the present invention will be described with reference to FIG. 11 and FIG. 12.

Figure 11:
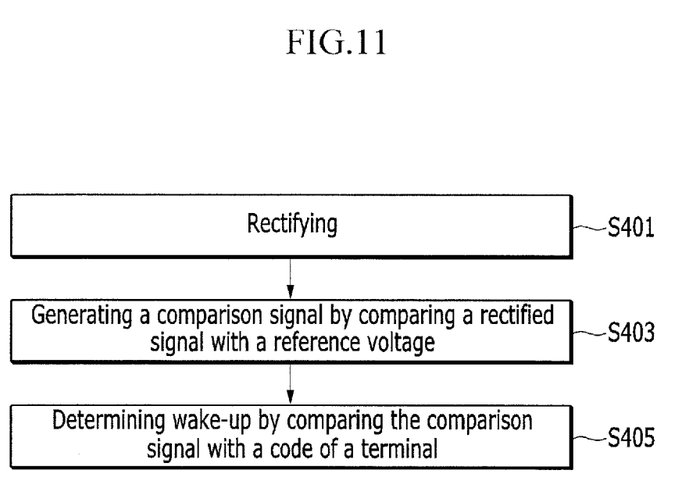
FIG. 11 shows a flowchart representing an operation of a wireless terminal according to an exemplary embodiment of the present invention.

FIG. 11 shows a flowchart representing the operation of the wireless terminal according to an exemplary embodiment of the present invention.

The detector 420 rectifies the second wake-up signal received through the antenna 410 and generates a rectified signal (S401).

The comparator 430 compares the signal output from the detector 420 with the reference voltage (ref) to generate a comparison signal (S403).

Figure 12:
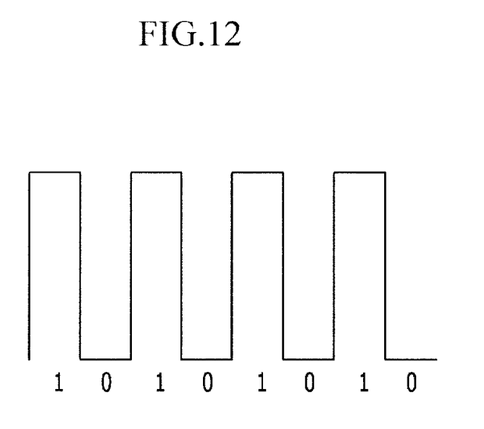
FIG. 12 shows a waveform diagram of an output signal of a comparator in a wireless terminal according to an exemplary embodiment of the present invention.

FIG. 12 shows a waveform of the output signal of the comparator in the wireless terminal according to an exemplary embodiment of the present invention. When the second wake-up signal corresponds to the signal shown in FIG. 9, the comparator 430 outputs the signal shown in FIG. 12.

The wake-up determining unit 440 compares the comparison signal with the code of the wireless terminal 400 and generates a wake-up control signal when the comparison signal is equal to the code (S405).

According to the exemplary embodiments of the present invention, it is possible to increase the number of wireless terminals to be woken up, the transmission distance of the wake-up signal, and the service coverage by the repeating of the central wake-up system with low power.

The above-described embodiments can be realized through a program for realizing functions corresponding to the configuration of the embodiments or a recording medium for recording the program in addition to through the above-described device and/or method, which is easily realized by a person skilled in the art.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. An apparatus for communicating a wake-up signal, comprising:
   a detector for rectifying a first wake-up signal and generating a rectified signal;
   a code generator for outputting a code signal that corresponds to a code of a wireless terminal; and
   a comparator for generating a second wake-up signal to be transmitted to the wireless terminal that is to be woken up by using the rectified signal and the code signal.

2. The apparatus of claim 1, wherein the rectified signal is input to a non-inverting terminal of the comparator and the code signal is input to an inverting terminal of the comparator.

3. The apparatus of claim 2, wherein the code signal has a low level of a bit "1" and has a high level of a bit "0".

4. The apparatus of claim 3, wherein a value of the high level is higher than a maximum value of the rectified signal.

5. The apparatus of claim 4, further comprising:
   a first antenna for receiving the first wake-up signal from a wake-up center; and
   a band pass filter for filtering the first wake-up signal and generating a filtered signal,
   wherein the detector rectifies the filtered signal.

6. The apparatus of claim 5, further comprising
   a first variable amplifier for performing variable amplification on the filtered signal and generating an amplified signal,
   wherein the detector rectifies the amplified signal.

7. The apparatus of claim 6, further comprising
   a second variable amplifier for performing variable amplification on the second wake-up signal and transmitting the amplified second wake-up signal through a second antenna.

8. A method for communicating a wake-up signal, comprising:
   rectifying a first wake-up signal and generating a rectified signal;

generating a code signal that corresponds to a code of a terminal to be woken up; and generating a second wake-up signal to be transmitted to the terminal by using the rectified signal and the code signal.

9. The method of claim 8, wherein the rectifying of the first wake-up signal includes receiving the first wake-up signal from a wake-up center.

10. The method of claim 9, wherein the rectifying of the first wake-up signal further includes:

performing band pass filtering on the first wake-up signal and generating a filtered signal;

performing variable amplification on the filtered signal and generating an amplified signal; and rectifying the amplified signal and generating the rectified signal.

11. The method of claim 10, wherein the generating of a second wake-up signal includes performing variable amplification on the second wake-up signal.

12. The method of claim 8, wherein the generating of a second wake-up signal includes comparing the rectified signal and the code signal to generate the second wake-up signal.

13. The method of claim 12, wherein the code signal has a low level of a bit "1" and has a high level of a bit "0", wherein a value of the high level is higher than a maximum value of the rectified signal.

* * * * *